United States Patent [19]
Scott

[11] Patent Number: 5,823,569
[45] Date of Patent: Oct. 20, 1998

[54] CHASSIS SYSTEM

[75] Inventor: James Roy Scott, Tayside, United Kingdom

[73] Assignee: Reekie Manufacturing, Limited, Forfar, United Kingdom

[21] Appl. No.: 722,275

[22] PCT Filed: Apr. 13, 1995

[86] PCT No.: PCT/GB95/00860

§ 371 Date: Oct. 9, 1996

§ 102(e) Date: Oct. 9, 1996

[87] PCT Pub. No.: WO95/28311

PCT Pub. Date: Oct. 26, 1995

[30] Foreign Application Priority Data

Apr. 13, 1994 [GB] United Kingdom .................... 9407578

[51] Int. Cl.⁶ ........................................................ B62D 21/00
[52] U.S. Cl. ............................ 280/781; 16/366; 280/783; 280/785; 280/790; 280/797; 280/798; 280/800
[58] Field of Search ...................................... 280/781, 782, 280/783, 785, 790, 797, 798, 800; 16/366

[56] References Cited

U.S. PATENT DOCUMENTS

| | | |
|---|---|---|
| 4,676,545 | 6/1987 | Bonfilio . |
| 4,846,198 | 7/1989 | Carnewal . |
| 5,149,132 | 9/1992 | Ruehl . |

FOREIGN PATENT DOCUMENTS

| | | |
|---|---|---|
| 0009975 | 4/1980 | European Pat. Off. . |
| 0187011 | 7/1986 | European Pat. Off. . |
| 385818 | 3/1908 | France . |
| 588626 | 3/1925 | France . |
| 2437972 | 4/1980 | France . |
| 2593767 | 8/1987 | France . |
| 362335 | 7/1962 | Switzerland ............................. 16/366 |
| 398716 | 9/1933 | United Kingdom . |
| 796829 | 6/1958 | United Kingdom . |
| 812595 | 4/1959 | United Kingdom . |
| 2031824 | 4/1980 | United Kingdom . |
| 1576342 | 10/1980 | United Kingdom . |
| 2257397 | 1/1993 | United Kingdom . |

*Primary Examiner*—Eric D. Culbreth
*Attorney, Agent, or Firm*—Young & Basile, P.C.

[57] ABSTRACT

The present invention relates to a vehicle or machinery (1) having a chassis (2) provided with ground engaging members (3) mounted on at least one transverse chassis member (4) and laterally spaced apart longitudinal chassis members (5). Each of the longitudinal chassis members (5) includes a plurality of modular elements (6) fastened together end-to-end (13, 14), which modular elements (6) are substantially hollow for housing therein moving parts (8) of the vehicle or machinery. The modular elements have access openings (18) for accessing the moving parts (8) in the interior (16) of the hollow modular elements (6), and closure panels (19) provided therefor. The present invention also extends to a modular chassis member (5) and a modular chassis element (6).

20 Claims, 2 Drawing Sheets

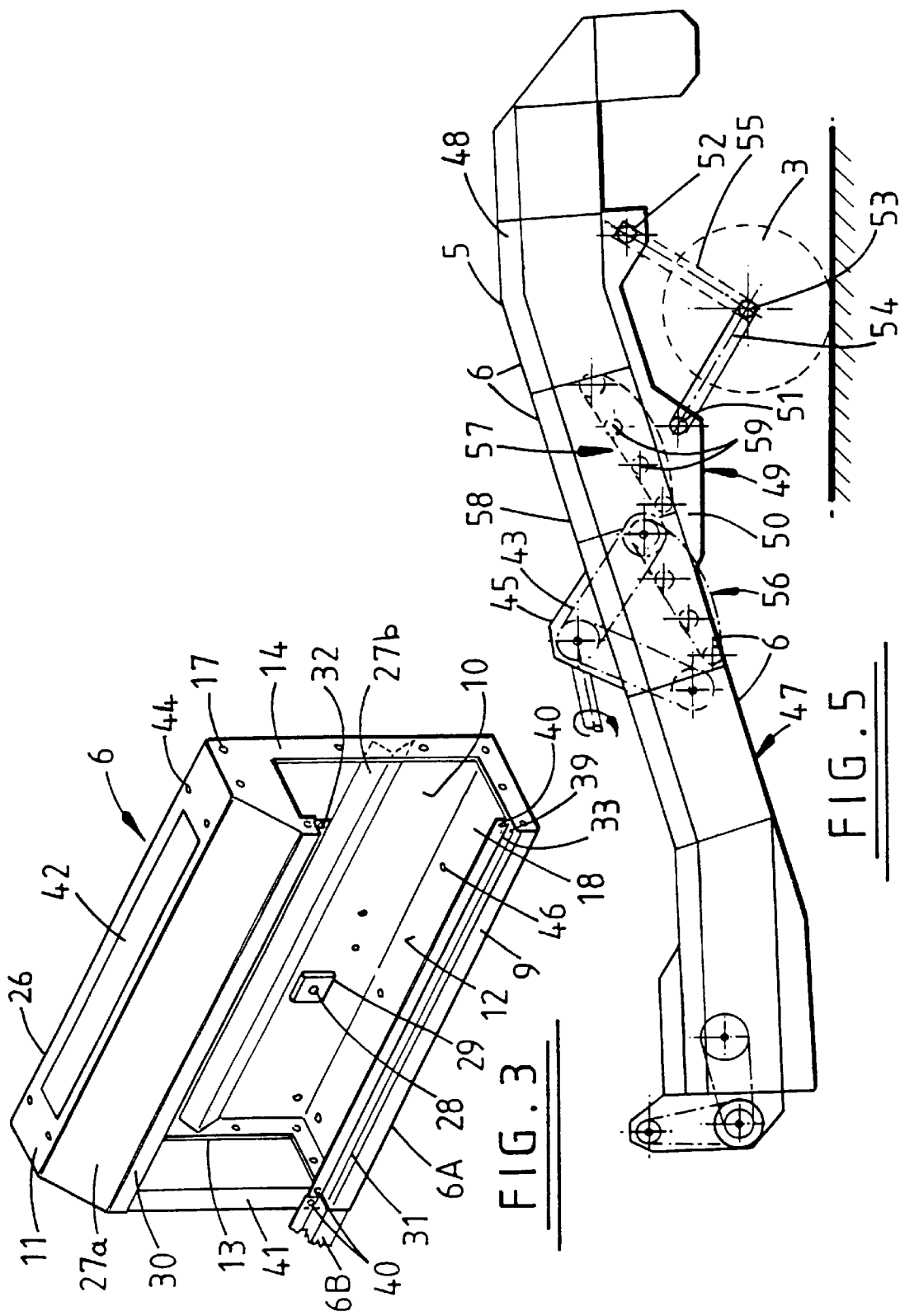

CHASSIS SYSTEM

The present invention relates to a chassis system and more particularly to an improved chassis system suitable for vehicles or static or mobile machinery.

Different users of a particular type of vehicle or travelling machinery often have different requirements in terms of size, operational capacity etc. This presents the manufacturer with the problem of having to manufacture and stock a range of different sized machines. This problem is moreover particularly acute in the need for the production of differently sized large components such as chassis members which can often be as long as 4 to 6 m which in itself can also present significant storage problems for such components.

It is an object of the present invention to avoid or minimize one or more of the above problems.

The present invention provides a vehicle or machinery having a chassis provided with ground engaging means and at least one transverse chassis member and laterally spaced apart longitudinal chassis members, wherein each of said longitudinal chassis members comprises a plurality of modular elements fastened together end-to-end, at least one of said modular elements being substantially hollow for housing therein moving parts and/or connection means for energizing and/or controlling moving parts of said vehicle or machinery, and having, access opening means for accessing said moving parts and/or connection means in the interior of said hollow modular elements. Conveniently the ground engaging means are mounted on a said transverse chassis member but could alternatively be mounted more or less directly from the longitudinal chassis members.

With a vehicle or machinery of the present invention a range of products with differently sized chassis can readily be provided by varying the number of said modular elements used to make up the longitudinal chassis members over a relatively wide range e.g. from 2 to 8 modular elements, e.g. by using 3, 4, 5 or 6 modular elements in each longitudinal chassis member. This avoids the need for producing and then storing a number of differently sized and relatively large chassis members.

In the case of vehicles or machinery, especially agricultural machinery such as crop harvesters graders, and separators where the longitudinal chassis members are used to mount various moving parts such as drive means including sprockets, pulleys, drive chains, belts; mechanical, hydraulic, pneumatic and other linkages and devices used for energizing and/or controlling the moving parts etc., the use of hollow chassis members has the further advantage of substantially enclosing these items thereby protecting them from dirty working conditions and damage, as well as protecting operators from injury through inadvertent contact with such parts in use of the vehicle or machinery. Advantageously the access openings provided to give access from the maintenance, adjustment etc. of such parts, are provided with door, shutter, flap or other suitable closure means in order more completely to enclose said moving parts etc.

Conveniently the modular elements are generally tubular with transverse flange, web, or panel means at their opposite ends for end-to-end abutment with further like elements and/or other chassis member elements, and securing thereto by any suitable fastening means, preferably releasable fastening means such as nuts and bolts. The elements may be of any suitable cross-section including rounded or polygonal. Conveniently though the elements are generally box-form with a rectangular cross-section.

The modular elements may however be more or less completely open on their outer side i.e. the modular elements being in the form of generally 'C' shaped or 'U' shaped sections, so as to provide substantially full length access openings therealong. If desired though additional stiffness and/or strength can conveniently be provided by means of struts or the like bridging across the open side of the section between the upper and lower portions or limbs thereof, most conveniently across the inter-abutting ends of the two adjoining modular elements.

The longitudinal stiffness of the modular chassis members will depend on inter alia the (vertical) depth of the modular elements and the thickness of the sheet material from which they are formed. It is moreover a particular feature of the present invention that chassis members of almost any length e.g. from 1 to 10 m can be assembled from modular elements in accordance with the present invention.

In general though for chassis members having a length of from 2 to 8 m, e.g. from 3 to 6 m, and using regular mild steel sheet (usually galvanized and/or other wise protected against corrosion) or plate having a thickness in the range from 2 to 5 mm, usually from 3 to 4 mm, we have found that adequate strength and/or stiffness can be obtained with a (vertical) depth of from 300 to 1000 mm, preferably 400 to 800 mm, conveniently from 500 to 700 mm, e.g. 600 mm. Additional strength and/or stiffness can be incorporated if desired in generally known manner e.g. by providing local reinforcing e.g. thickened portions around bolt or shaft receiving apertures, and/or by the use of stiffening ribs formed in the section wall, especially the inward-side upright wall of the modular element section. Conveniently such stiffening ribs extend longitudinally of the modular element but other arrangements are also possible. Additional strength and/or stiffness to a chassis constructed in accordance with the present invention can be provided by means of using transverse members in the form of one or more sub-chassis, most conveniently for mounting of the wheels or other ground-engaging means.

The modular chassis members according to the present invention may be substantially rectilinear, but may also be cranked to a greater or lesser extent e.g. may have a lazy— 'S' or 'Z' form. Thus there may be used different modular elements within a given chassis member with at least one modular element being cranked, or, more conveniently, at least one modular element having at least one end face inclined relative to its longitudinal axis, so that joining such a modular element to another non-cranked one with an end face substantially orthogonal to its longitudinal axis, will provide a cranked modular chassis member.

In general it is desirable for various reasons including safety, protection of various components including electrical wiring and pressurized fluid lines against damage, and protection of moving parts and against impress of foreign material and damage resulting therefrom, to provide the access openings with closure means. These may be of any suitable form known in the art but conveniently are in the form of hinged door panels, preferably using hinge means which allow more or less 180° opening.

Another particular advantage of the invention that may be mentioned is the facility it provides for adapting machinery to different requirements. Thus for example a harvesting, grading, and/or separating machine may utilize 3, 4, 5, or 6 web units according to the amount and type of work undertaken by the user. Whereas in the past a user with a 3 or 4 web machine would have had to replace his entire machine, with the present invention it becomes possible to modify the machine by incorporating one or more modules with the required additional web units mounted on modular chassis elements which can be inserted into the existing modular chassis members. The retro-fitting of modules providing new or improved processing units can also be achieved in like manner. The present invention also facilitates a more modular approach to the construction of a machine using modules each comprised of one or more pairs of modular chassis elements interconnected by transverse members such as drive shafts, spindles, idler, rollers, structural cross-members etc and other parts utilized in the module, except for certain parts such as electrical wiring, pressurized fluid lines, drive belts, web belts, which are more conveniently installed once the module has been connection to other modules or modular elements.

Further preferred features and advantages of the invention will appear from the following detailed description given by way of example of some preferred embodiments illustrated with reference to the accompanying drawings in which:

FIG. 3 is a perspective view of another embodiment of a modular chassis element;

FIG. 5 is a schematic side elevation of a potato grader with a chassis constructed from elements similar to that in FIG. 3.

Figure 1:
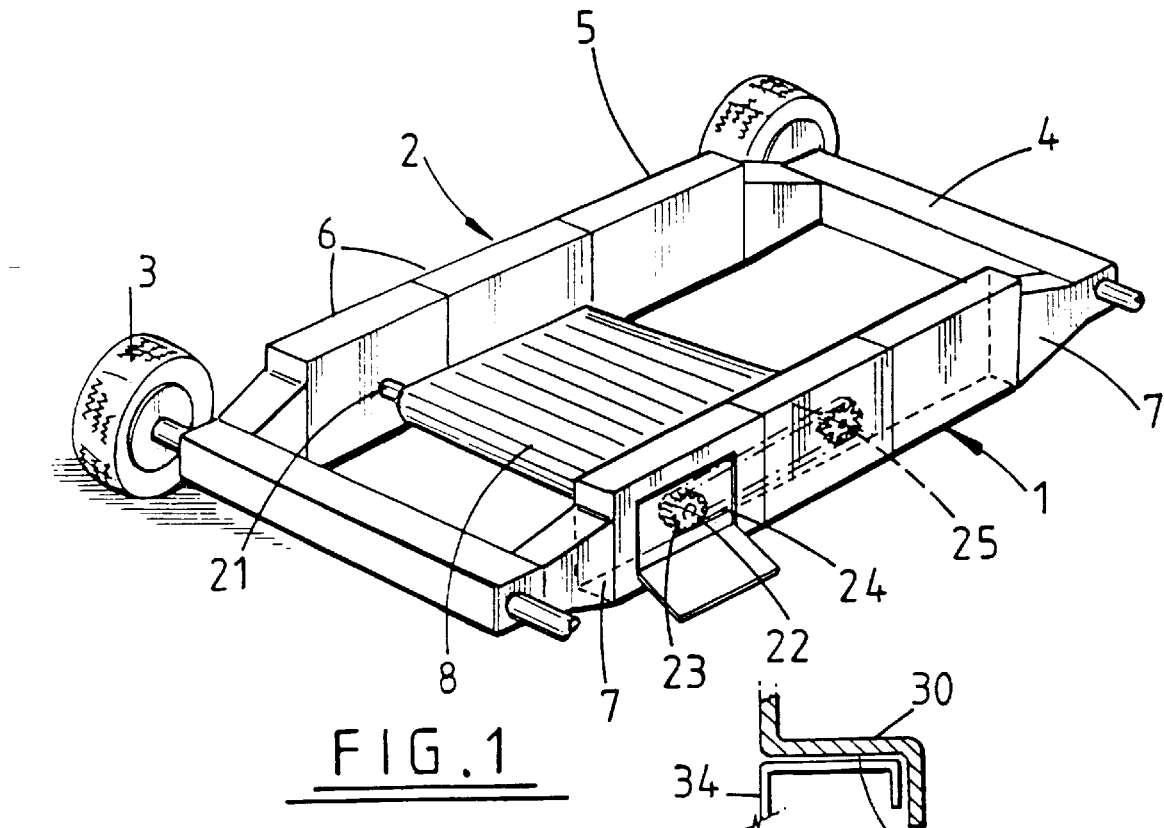
FIG. 1 is a partly cut-away schematic perspective view of an item of agricultural machinery with a modular chassis of the present invention.

FIG. 1 shows schematically an item of agricultural machinery 1 which could be a crop harvester, stone/clod separator, or other fixed, towable or self-propelled item of machinery, having a chassis 2 and ground engaging means which in this case are in the form of wheels 3.

In more detail the chassis 2 comprises two longitudinally spaced apart transverse chassis members 4 on which are mounted the wheels 3, and two laterally spaced apart longitudinal chassis members 5. Each of the latter is made up of 3 modular elements 6 connected end-to-end and two end units 7 which are connected to the transverse chassis members 4. Various items of operating equipment such as for example an open web belt, star cleaner or other separating device 8, are mounted on and between the longitudinal chassis members 5.

Figure 2:
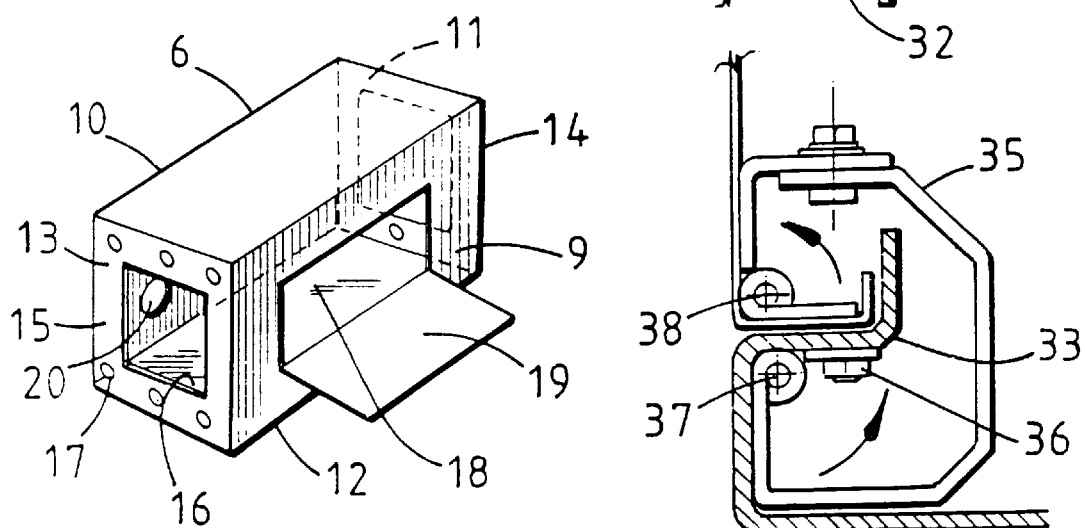
FIG. 2 is a perspective view of an individual chassis element.

As shown in FIG. 2 each of the modular chassis elements 6 is generally box-shaped with an outer side wall 9, inner side wall 10, top and bottom panels 11, 12, and respective end walls 13, 14 in the form of annular flanges 15 defining a central aperture 16. The flanges 15 are provided with a plurality of bolt holes 17 for receiving therethrough fasteners such as bolts and nuts for connecting the modular element 6 to another like element or an end unit 7. The outer side wall 9 has a rectangular opening 18 provided with a drop-down closure panel 19 for accessing the hollow interior of the modular element 6.

The inner side wall 10 is provided with suitably arranged mounting apertures 20 for supporting parts of the operating equipment 8 such as a drive shaft 21 (see FIG. 1). On the end 22 of the drive shaft inside the element 6 is mounted a drive sprocket 23 which is connected via a drive chain 24 to other sprockets 25, and/or guides, drive means etc. It will be appreciated that the sprockets 23, 25 and drive chain 24 are on the one hand protected against dirty working conditions, the weather and damage from foreign bodies and on the other hand are shielded from operators protecting the latter from accidental injury therefrom, by the elements without the need for any separate guards or the like thereby on the one hand reducing manufacturing cost and complexity and on the other hand simplifying, at least to some extent, access to these parts.

It will also be understood that a wide range of items can all be enclosed within the chassis in this way including mechanical linkages; levers; adjustment devices e.g. for varying tensioning in conveyor belts, drive belts etc; drive means such as chains, V-belts, toothed belts; displacement devices such as piston and cylinder devices; energizing means including electrical pneumatic and/or hydraulic lines etc; and various other parts which are normally to be found mounted externally on the longitudinal chassis members of existing vehicles and machinery. A further advantage of the invention is that by housing all these within the chassis, the outside thereof can present a significantly "cleaner" form thereby reducing the risk of snagging and interference therewith, as well as improving the appearance thereof.

Figure 4:
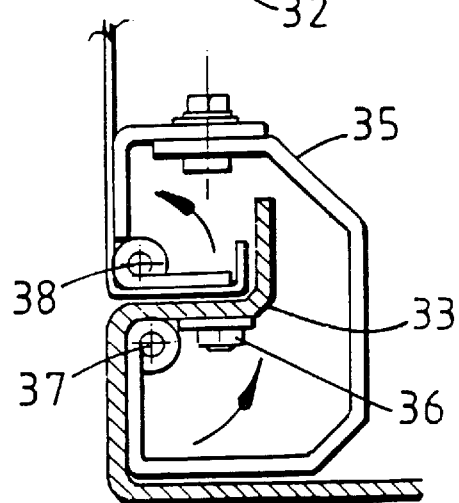
FIG. 4 is a detail transverse section of the element of FIG. 3 showing the mounting of an access opening door.

In FIGS. 3 to 5 like parts corresponding generally to those in FIGS. 1 and 2 are indicated by the like reference numerals.

The modular chassis element 6 of FIG. 3 differs from that of FIG. 2 in that it has a full length access opening 18 along its outer side wall 9 and is in the form of a generally 'U' or 'C'-shaped sections 26 conveniently made by folding/bending sheet steel, with generally 'U' or 'C'-shaped end wall portions 14 in which are provided the bolt holes 17, and which are conveniently welded or similarly secured to section 26. The top panel 11 also has a downwardly sloping outer edge portion 279 which helps shed soil or the like falling onto it. In order to provide additional strength and stiffness in the chassis, the upright inner side wall 10 has formed therein a generally V-shaped section rib 276, and localized strengthening is provided around a fixing or mounting aperture 28 in the form of a reinforcing plate 29 welded to the inner side wall 10.

As noted above, this modular element 6 has a full length opening 18 defined between outside wall upper and lower edge portions 30, 31 formed to define inwardly extending shoulders 32, 33 for receiving door panels 34 (see FIG. 4) substantially flush with the front face of the modular element 6 in the closed position of the door panel 34. As shown in FIG. 4 the door panel 34 is mounted on a novel double-acting hinge means 35 provided by the present invention, which is secured at 36 to the lower edge shoulder 33 and having spaced apart first and second hinge axes 37, 38 formed and arranged so as to allow movement of the door panel 34 through substantially 180° to allow easy access to the interior of the hollow modular element 6.

The outside wall edge portions 30, 31 are also provided at their lateral ends 39 with bolt holes 40 for securing vertical struts 41 to the lateral ends of two adjoining modular elements 6A, 6B to bridge across the upper and lower edge portions 30, 31 to provide additional strength and stiffness to the longitudinal chassis members 5.

The top wall 11 of the modular element 6 may also have an elongate aperture 42 to allow routing therethough of drive belts 43 or other components (see FIG. 5) and bolt holes 44 for securing safety covers 45 or the like to said top wall 11. The bottom wall 12 may also be provided with drainage apertures 46.

FIG. 5 shows schematically some of the principal parts of a stone and clod separator 47 having longitudinal chassis members 5 made up of a plurality of modular chassis elements 6 and supported at its rear end 48 on a pair of wheels 3 via a sub-chassis 49. In more detail the sub-chassis 49 comprises a pair of longitudinal members 50 interconnected by forward and rear tubular cross-members 51, 52 which are connected to the wheel axle 53 by swinging arms 54 and hydraulic arms 55 in generally known manner. The sub-chassis 49 forms a substantially rigid unit which further contributes to the overall stiffness and rigidity of the modular longitudinal chassis members 5.

As also shown in FIG. 5 the separator 47 has a plurality of web units 56, 57 each of which is mounted across a respective pair of modular chassis elements 6 which facilitates construction and/or modification of the separator by enabling the production of more or less complete web modules 58 made up of a pair of modular chassis elements 6 and web support shafts 59 and the like which can be connected to other modules during construction or inserted into or removed from the modular chassis of an existing separator of the invention for the purposes of modification thereof, with only relatively limited additional measures being required e.g. in relation to routing and/or connecting up webs, drive belts, wiring, pressured fluid supply lines etc.

It will be appreciated that various modifications may be made to the above described embodiment without departing from the scope of the present invention. Thus for example the ground engaging means may be in the form of skids, tracks, support legs etc. Also the longitudinal chassis members could be branched and/or have additional modular chassis elements or other equipment secured to the top and/or bottom of modular chassis elements within the modular chassis members.

I claim:

1. An agricultural vehicle or machinery having a chassis provided with ground engaging means and at least one transverse chassis member and laterally spaced apart longitudinal chassis members, characterized in that each of said longitudinal chassis members comprises a plurality of modular elements fastened together end-to-end, which modular elements are substantially hollow for housing therein moving parts of said agricultural vehicle or machinery and have access opening means for accessing said moving parts in the interiors of said substantially hollow modular elements, said access opening means being provided with closure means for preventing ingress of foreign matter into the hollow interiors of said modular elements in use of said vehicle or machinery, said modular elements being fastened to each other by releasable fastener means extending through transversely extending flanges provided at connection ends of the modular elements and defining a substantially unobstructed hollow interior space extending longitudinally along said chassis member along said plurality of modular elements for housing therein longitudinally extending moving parts.

2. An agricultural vehicle or machinery according to claim 1 wherein is used a said substantially hollow modular element which comprises a generally 'C'-shaped section having a said access opening means defined therein in the form of a substantially full-length access opening.

3. An agricultural vehicle (or machinery according to claim 1 wherein is used a said hollow modular element which is substantially tubular.

4. An agricultural vehicle or machinery as claimed in claim 3 wherein said modular elements have a substantially rectangular cross-section.

5. An agricultural vehicle or machinery as claimed in claim 4 wherein at least one of said modular elements has a longitudinal axis and at least one end face inclined relative thereto.

6. An agricultural vehicle or machinery as claimed in claim 4 wherein at least one of said modular elements is cranked intermediate its ends.

7. An agricultural vehicle or machinery as claimed in claim 6 wherein said moving parts are substantially enclosed within said modular elements and are selected from sprockets, drive chains, and drive belts.

8. An agricultural vehicle or machinery as claimed in claim 7 wherein an inward side wall of a said modular element is provided with mounting means for supporting said moving parts.

9. An agricultural vehicle or machinery as claimed in claim 8 wherein said mounting means comprises an aperture formed and arranged to allow said moving parts inside said modular elements to be connected to an item of operating equipment in use on said vehicle or machinery.

10. An agricultural vehicle or machinery as claimed in claim 9 wherein said inward side wall is reinforced around said mounting means aperture.

11. An agricultural vehicle or machinery as claimed in claim 10 wherein the inward side wall of a said modular element is provided with at least one stiffening rib.

12. An agricultural vehicle or machinery as claimed in claim 11 wherein said rib is in the form of a cranked portion of said inward side wall.

13. An agricultural vehicle or machinery as claimed in claim 12 wherein said ground engaging means are mounted said at least one transverse chassis member.

14. An agricultural vehicle or machinery as claimed in claim 13 which comprises a crop harvester.

15. An agricultural vehicle or machinery according to claim 13 which comprises a grader.

16. An agricultural vehicle or machinery according to claim 13 which comprises a separator.

17. An agricultural vehicle or machinery according to claim 1, wherein said access opening means of each said modular element is provided in an outer side wall of said modular element.

18. An agricultural vehicle or machinery as claimed in claim 1, wherein said closure means are mounted on double acting hinges secured to the modular elements, each said double acting hinge comprising a generally 'C'-shaped section body having first and second free edge portions and first and second hinge portions hingedly connected to respective ones of said free edge portions of said generally 'C'-shaped section body.

19. A substantially hollow modular chassis element suitable for use in an agricultural vehicle or machinery having a chassis provided with ground engaging means and at least one transverse chassis member and laterally spaced apart longitudinal chassis members, each said longitudinal chassis member comprising a plurality of said modular elements fastened together end-to-end, which modular chassis element comprises a longitudinally extending section having top, bottom and inward side walls and defining an access opening at an outward side, and provided at each end with connection portions in the form of transverse flanges, each connection portion being provided with a plurality of apertures formed and arranged for receiving therethrough releasable fastener means, and wherein said access opening is provided with closure means for preventing ingress of foreign matter into said hollow modular element.

20. A modular chassis member comprising a plurality of modular chassis elements according to claim 19 fastened together end-to-end.

* * * * *